US009483645B2

(12) United States Patent
Dalcher

(10) Patent No.: US 9,483,645 B2
(45) Date of Patent: Nov. 1, 2016

(54) SYSTEM, METHOD, AND COMPUTER PROGRAM PRODUCT FOR IDENTIFYING UNWANTED DATA BASED ON AN ASSEMBLED EXECUTION PROFILE OF CODE

(75) Inventor: Gregory William Dalcher, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 2533 days.

(21) Appl. No.: 12/042,923

(22) Filed: Mar. 5, 2008

(65) Prior Publication Data
US 2013/0275952 A1  Oct. 17, 2013

(51) Int. Cl.
*G06F 21/56* (2013.01)
*G06F 21/55* (2013.01)

(52) U.S. Cl.
CPC ........... *G06F 21/563* (2013.01); *G06F 21/554* (2013.01)

(58) Field of Classification Search
CPC ........................... G06F 21/554; G06F 21/566
USPC ................................. 714/38; 726/24; 724/24
See application file for complete search history.

(56) References Cited

U.S. PATENT DOCUMENTS

| 5,974,549 A | 10/1999 | Golan |
| 5,987,610 A | 11/1999 | Franczek et al. |
| 6,073,142 A | 6/2000 | Geiger et al. |
| 6,460,050 B1 | 10/2002 | Pace et al. |
| 7,506,155 B1 | 3/2009 | Stewart et al. |
| 8,353,033 B1 | 1/2013 | Chen et al. |
| 2002/0178375 A1* | 11/2002 | Whittaker et al. ............ 713/200 |
| 2003/0101381 A1* | 5/2003 | Mateev et al. .................. 714/38 |
| 2005/0071633 A1 | 3/2005 | Rothstein |
| 2005/0108562 A1 | 5/2005 | Khazan et al. |
| 2007/0204257 A1* | 8/2007 | Kinno et al. .................. 717/100 |
| 2007/0240222 A1* | 10/2007 | Tuvell et al. .................... 726/24 |
| 2008/0250481 A1* | 10/2008 | Beck et al. ........................ 726/6 |
| 2009/0113111 A1 | 4/2009 | Chen et al. |
| 2010/0011209 A1 | 1/2010 | Kiriansky et al. |
| 2010/0064367 A1 | 3/2010 | Hansen |
| 2011/0083176 A1 | 4/2011 | Martynenko et al. |
| 2012/0255000 A1 | 10/2012 | Sallam et al. |

FOREIGN PATENT DOCUMENTS

| WO | WO 0219064 A2 * | 3/2002 |
| WO | 2013/025323 A1 | 2/2013 |

OTHER PUBLICATIONS

U.S. Appl. No. 11/749,635, filed May 16, 2007.
U.S. Appl. No. 11/673,762, filed Feb. 12, 2007.
U.S. Appl. No. 11/626,808, filed Jan. 24, 2007.
U.S. Appl. No. 11/561,809, filed Nov. 20, 2006.
U.S. Appl. No. 11/857,373, filed Sep. 18, 2007.

(Continued)

*Primary Examiner* — Dao Ho
(74) *Attorney, Agent, or Firm* — Blank Rome, LLP

(57) ABSTRACT

A system, method, and computer program product are provided for identifying unwanted data based on an assembled execution profile of code. In use, an execution profile of code is assembled by tracking interface usage of the code. Further, it is determined whether the code is associated with unwanted activity, based on the execution profile.

26 Claims, 5 Drawing Sheets

(56) References Cited

OTHER PUBLICATIONS

"Cisco Secure Desktop Configuration Guide for Cisco ASA 5500 Series Administrators," Software Release 3.2, Jun. 2007, Cisco Systems, Inc.

International Search Report and Written Opinion received for PCT application No. PCT/US2012/048415, mailed on Dec. 10, 2012, 9 Pages.

Dalcher, "System, Method, and Computer Program Product for Dynamically Adjusting a Level of Security Applied to a System", U.S. Appl. No. 12/111,851, filed Apr. 29, 2008, X Pages.

Dalcher, Gregory W., "System, Method, and Computer Program Product for Invoking an Application Program Interface Within an Interception of Another Application Program Interface", U.S. Appl. No. 12/019,514, filed Jan. 24, 2008, X Pages.

* cited by examiner

SYSTEM, METHOD, AND COMPUTER PROGRAM PRODUCT FOR IDENTIFYING UNWANTED DATA BASED ON AN ASSEMBLED EXECUTION PROFILE OF CODE

FIELD OF THE INVENTION

The present invention relates to security systems, and more particularly to security systems for detecting unwanted data.

BACKGROUND

Security systems have traditionally been utilized for detecting unwanted activity. Such unwanted activity is oftentimes associated with malware, such that the security systems have also detected the malware responsible for the unwanted activity. However, malware has generally evolved for evading detection techniques employed by conventional security systems, thus limiting detection capabilities by the security systems.

Just by way of example, malware activities have customarily been tailored to take advantage of areas of reduced coverage by security systems. In addition, detection techniques utilized by the security systems are oftentimes limited due to performance concerns, compatibility impact, operating systems limitations, etc. There is thus a need for addressing these and/or other issues associated with the prior art.

SUMMARY

A system, method, and computer program product are provided for identifying unwanted data based on an assembled execution profile of code. In use, an execution profile of code is assembled by tracking interface usage of the code. Further, it is determined whether the code is associated with unwanted activity, based on the execution profile.

DETAILED DESCRIPTION

Figure 1:
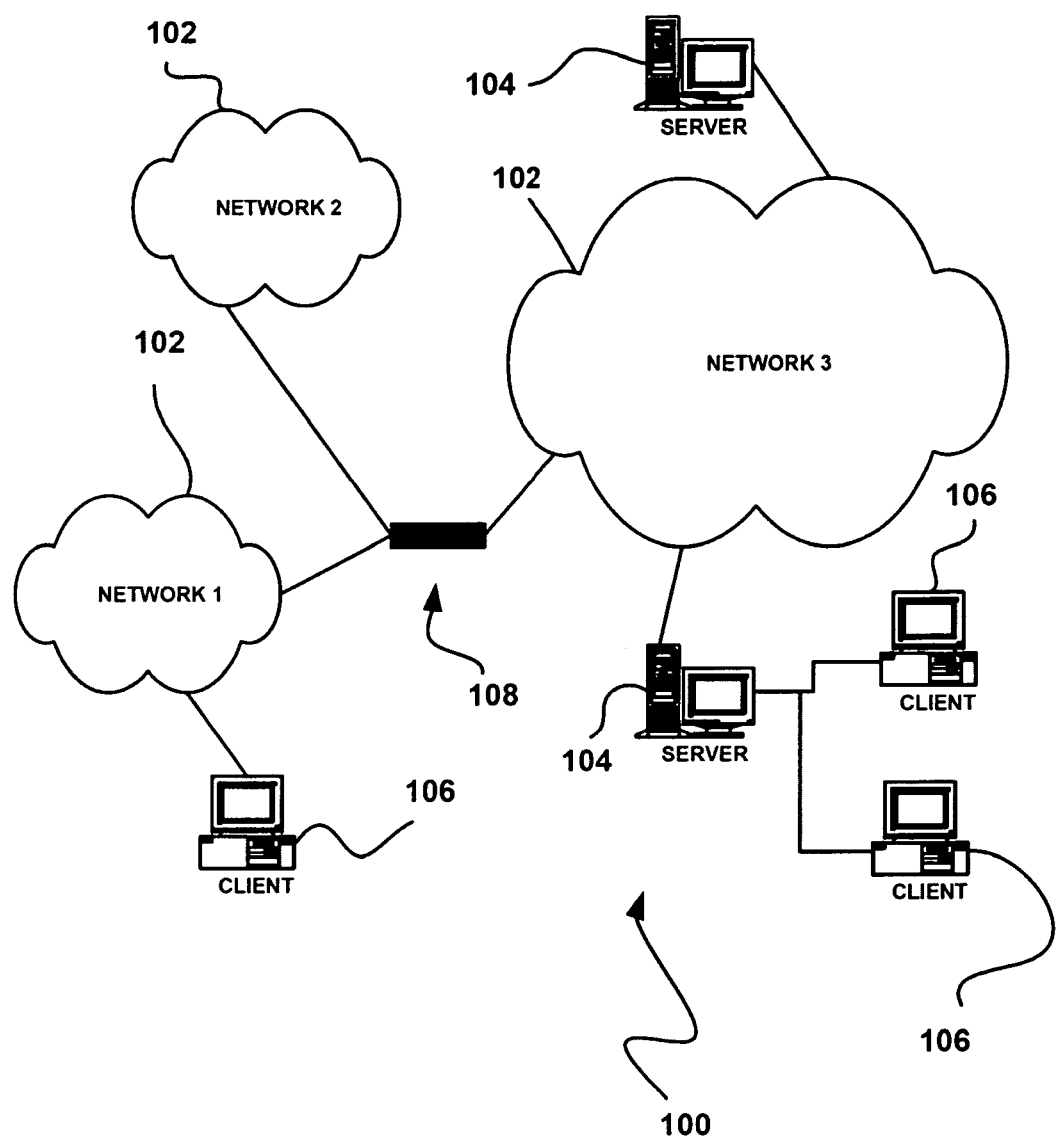
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
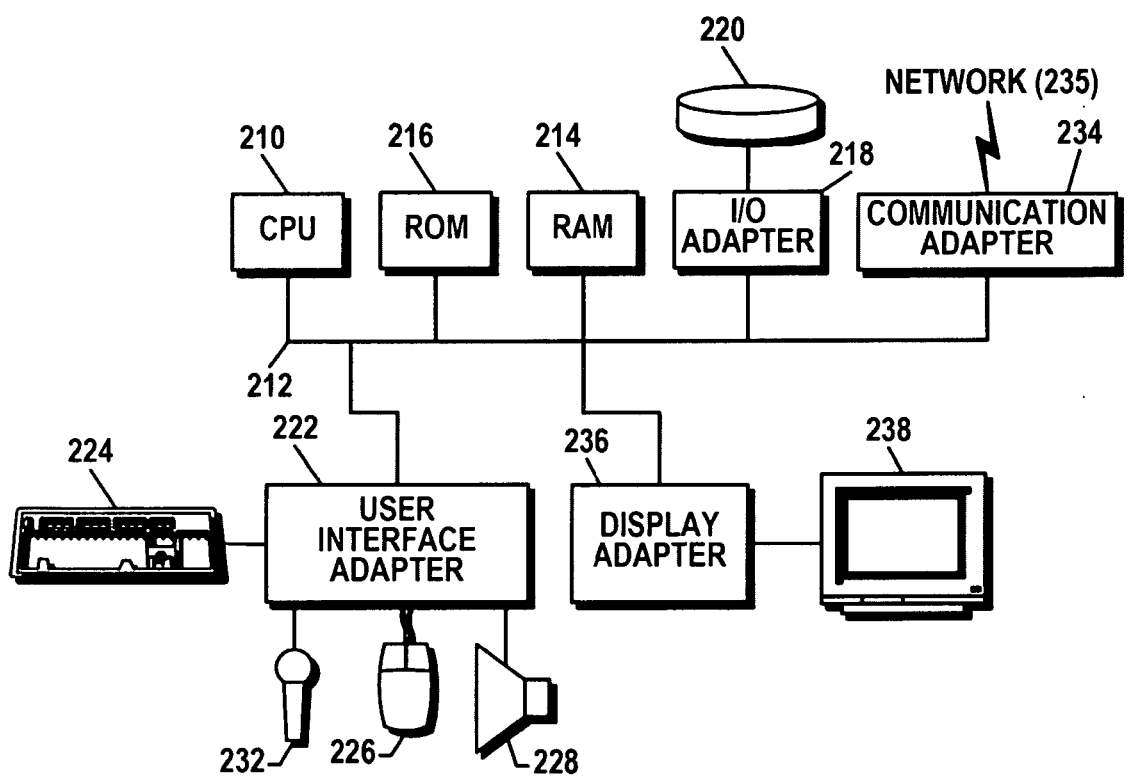
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
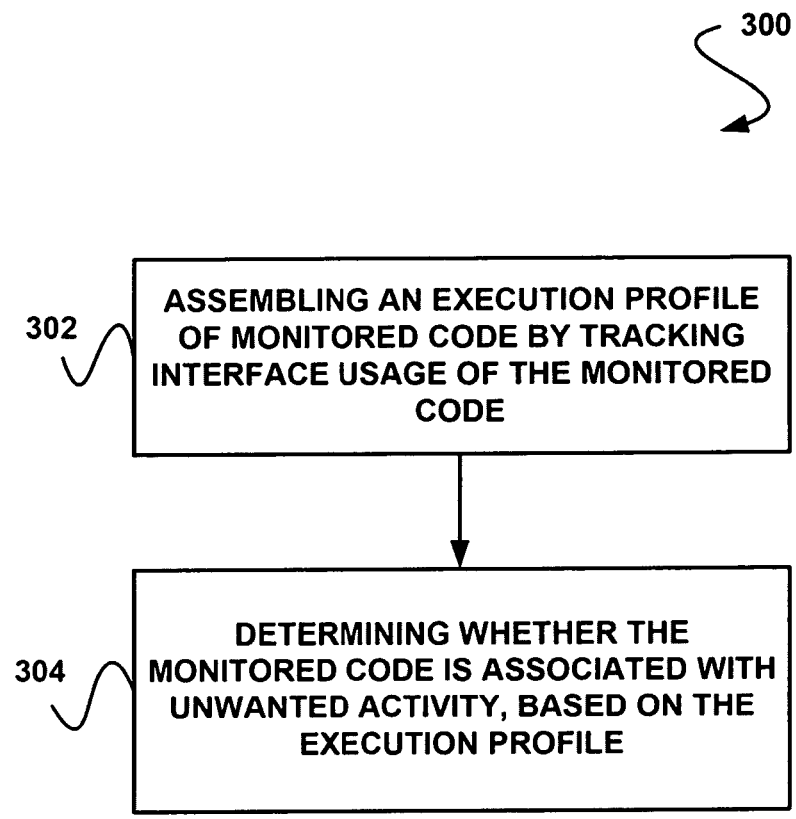
FIG. 3 shows a method for identifying unwanted data based on an assembled execution profile of monitored code, in accordance with one embodiment.

FIG. 3 shows a method 300 for identifying unwanted data based on an assembled execution profile of monitored code, in accordance with one embodiment. As an option, the method 300 may be carried out in the context of the architecture and environment of FIGS. 1 and/or 2. Of course, however, the method 300 may be carried out in any desired environment.

As shown in operation 302, an execution profile of monitored code is assembled by tracking interface usage of the monitored code. With respect to the present description, the execution profile of the monitored code may include any information associated with execution of the monitored code. For example, the information may include components invoked (e.g. called, etc.) by the monitored code, such as interfaces, libraries, drivers, etc. In this way, the execution profile may optionally indicate a history of execution of the monitored code.

Additionally, the execution profile may be assembled in any manner that is based on the tracking of interface usage of the monitored code. Such interface usage may include at least one invocation of an interface by the monitored code. For example, the interface usage may include an invocation of an application program interface (API). Thus, tracking the interface usage may include identifying the interface usage, logging the interface usage, etc. Of course, however, it should be noted that the execution profile may also be assembled based on invocation by the monitored code of libraries, drivers, etc.

As an option, the interface usage may be tracked using behavioral detection. In one embodiment, behaviors of the code with respect to utilizing at least one interface may be detected. The behaviors may include, for example, invocation of an interface by the monitored code. In one embodiment, the behavior detection may generate a history of the interface usage and analyze the history, for assembling the execution profile. In this way, the behavioral detection may be utilized for monitoring the code.

As another option, the interface usage may be tracked via interface monitoring. The interface monitoring may include any monitoring of execution of at least one interface. Just by way of example, interfaces known (e.g. predetermined, etc.) to be utilized by malware for performing an intended function of the malware may be monitored. As another example, interfaces capable of allowing an element of execution of the code (e.g. a thread, process, etc.) to be altered may be monitored. Accordingly, interface usage may optionally be tracked by monitoring the code (e.g. execution of an interface by the code, etc.).

In various embodiments, the interface monitoring may be performed utilizing in-line hooking, interface pointer redirection, callbacks provided by an underlying system (e.g. operating system), etc. For example, the interface monitoring may be performed as described in any of: U.S. patent Ser. No. 11/749,635, filed on May 16, 2007 and entitled "System, Method And Computer Program Product For Analyzing Stack Call Frames That Are monitored While A Stack Is Unwound"; U.S. patent Ser. No. 11/673,762, filed on Feb. 12, 2007 and entitled "System, Method And Computer Program Product For Utilizing Code Stored In A Protected Area Of Memory For Securing An Associated System", U.S. patent Ser. No. 11/626,808, filed on Jan. 24, 2007 and entitled "System, Method And Computer Program Product For Monitoring And/Or Analyzing At Least One Aspect Of An Invocation Of An Interface"; and/or U.S. patent Ser. No. 11/561,809, filed on Nov. 20, 2006 and entitled "System, Method And Computer Program Product For Verifying Invocations Of Interfaces."

In one embodiment, the execution profile may be assembled in response to an event associated with the monitored code. Such event may include invocation of a monitored interface, as an option. As another option, the event may include generation of a predetermined type of monitored input/output operation.

Furthermore, as shown in operation 304, it is determined whether the monitored code is associated with unwanted activity, based on the execution profile. In the context of the present description, the unwanted activity may include any activity (e.g. memory allocations, data storage, thread creation, etc.) that is unwanted. Just by way of example, the unwanted activity may activity of malware (e.g. a virus, a worm, etc.).

Still yet, the execution profile may be analyzed in any manner for determining whether the monitored code is associated with unwanted activity. In one embodiment, the determination may include comparing the execution profile to at least one known legitimate execution profile. The known legitimate execution profile may be an execution profile predetermined to be associated with trusted code (e.g. code not associated with unwanted activity, code associated with a trusted source, etc.). Accordingly, it may optionally be determined that the code is associated with unwanted activity if the execution profile does not match the known legitimate execution profile. Of course, however, it may be determined that the monitored code is associated with wanted activity if the execution profile matches the known legitimate execution profile.

In another embodiment, the determination may include determining whether an owner of executable memory associated with the execution profile is legitimate. The executable memory may include memory storing the monitored code for which the execution profile is assembled, for example. Additionally, the owner of the executable memory may include a loaded executable by which the executable memory is backed, a process and/or thread that created the executable memory, etc.

Moreover, the owner of the executable memory may be compared with at least one known legitimate process, known legitimate module, etc., for determining whether the owner of the executable memory associated with the execution profile is legitimate. For example, the owner of the executable memory may be legitimate if the owner matches a known legitimate process. In this way, it may optionally be determined that the monitored code is associated with the unwanted activity if the owner of the executable memory is determined to be illegitimate.

To this end, the execution profile of the monitored code may be utilized for determining whether the monitored code is associated with unwanted activity. For example, the execution profile may be utilized for detecting patterns of malicious activity. As another example, the execution profile may be utilized for detection subversion of legitimate execution paths by malware. In various embodiments, the execution profile may be utilized for detecting user mode and/or kernel mode key-loggers, rootkits (e.g. kernel mode, user mode, database-hosted, etc. rootkits), browser-hosted malware (e.g. scripts, plug-ins, etc.), etc.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
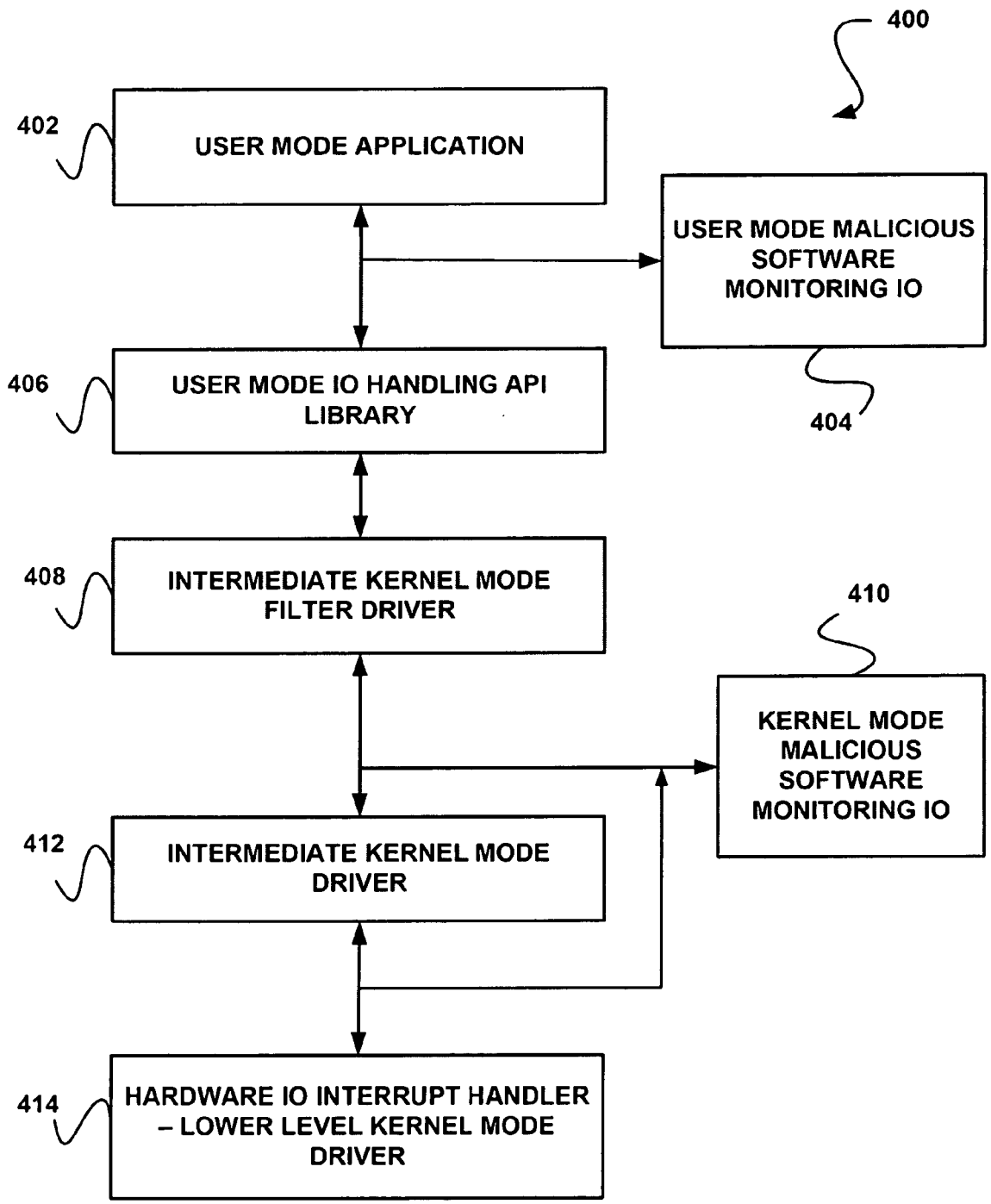
FIG. 4 shows a system in which malware is inserted into processing associated with input/output operations, in accordance with another embodiment.

FIG. 4 shows a system 400 in which malware is inserted into processing associated with input/output operations, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a user mode application 402 is in communication with a user mode input/output (IO) handling API library 406. The user mode application 402 may include any application capable of being utilized by a user of a device. For example, the user mode application 402 may include a web browser. To this end, the user mode application 402 may be utilized by a user for performing IO operations (e.g. network transmissions, etc.).

Further, the user mode IO handling API library 406 may include any library utilized by the user mode application 402 for IO handling associated with the user mode application 402. For example, the user mode IO handling API library 406 may handle IO operations associated with the user mode application 402. As also shown, a user mode malicious software monitoring IO 404 may be inserted at a user mode level (e.g. of an operation system). In one embodiment, user mode malicious software monitoring IO 404 may include code capable of monitoring and/or intercepting IO operations at the user mode level, such as, for example, IO operations performed utilizing the user mode application 402.

Additionally, the user mode IO handling API library 406 is in communication with an intermediate kernel mode filter driver 408. The intermediate kernel mode filter driver 408 may include any driver capable of filtering data at the kernel mode level. Also, the intermediate kernel mode filter driver 408 is in communication with an intermediate kernel mode driver 412. In another embodiment, a kernel mode malicious software monitoring IO 410 may be inserted at an intermediate kernel mode level, as shown. For example, the kernel mode malicious software monitoring TO 410 may include code capable of monitoring and/or intercepting IO operations at the intermediate kernel mode level.

Still yet, the intermediate kernel mode driver 412 is in communication with a hardware IO interrupt handler and lower level kernel mode driver 414. Thus, the hardware IO interrupt handler and lower level kernel mode driver 414 may operate at the low kernel mode level. The lower level kernel mode driver 414 may be utilized for receiving keystroke events, for example. In yet another embodiment, the kernel mode malicious software monitoring IO 410 may also be inserted at the low kernel mode level, for monitoring and/or intercepting IO operations at the low kernel mode level.

To this end, IO operations originating at the user mode application 402 and/or the kernel mode driver 414 may be legitimately handled (e.g. without monitoring by malicious software) in situations where the user mode malicious software monitoring IO 404 and the kernel mode malicious software monitoring IO 410 are not present in the system 400. However, monitoring IO operations may be performed by malware for gathering data associated with the IO operations at various system levels (e.g. utilizing the user mode malicious software monitoring IO 404 and/or the kernel mode malicious software monitoring IO 410).

Figure 5:
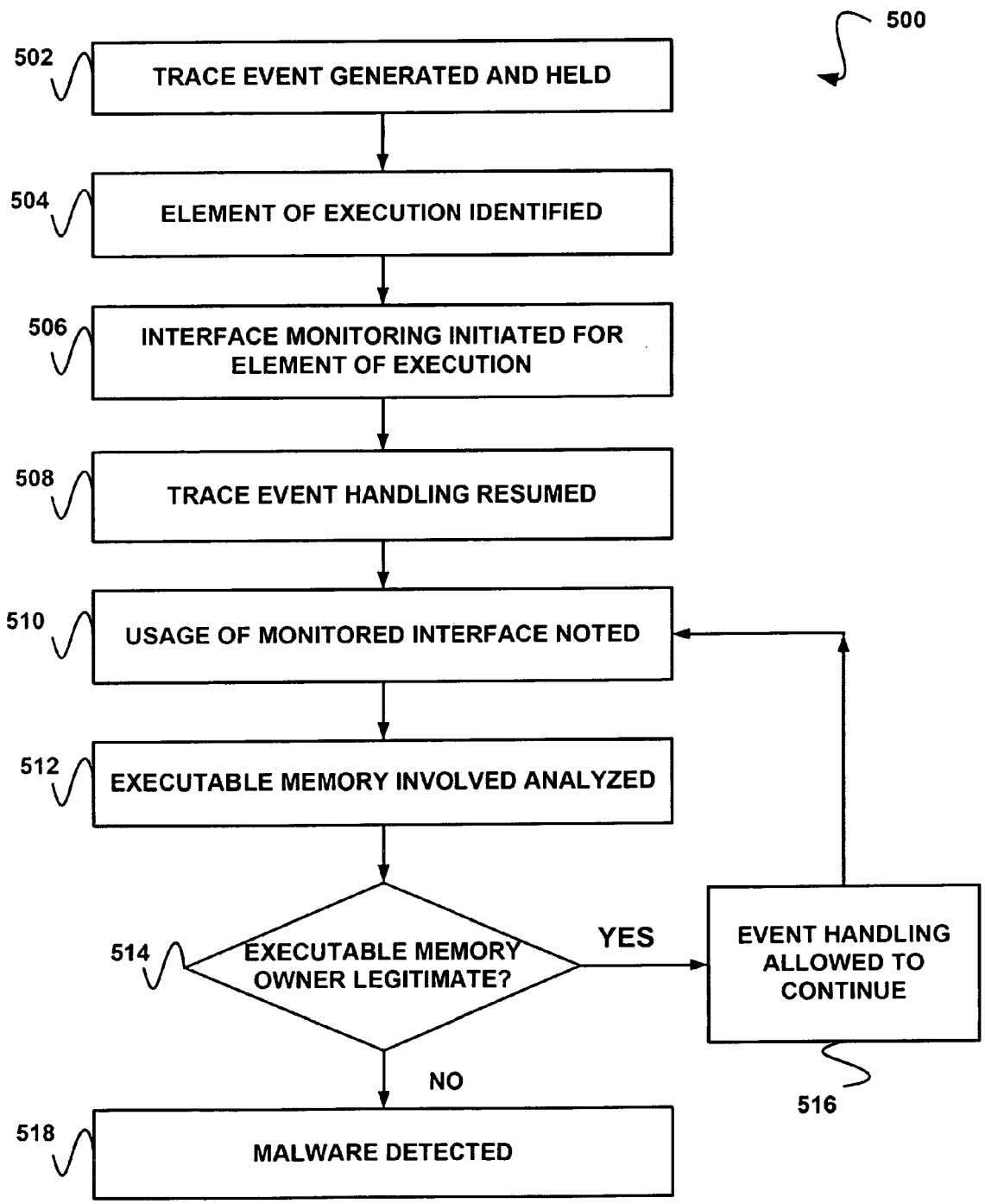
FIG. 5 shows a method for conditionally detected malware based on a determination of whether an owner of executable memory associated with a monitored event is legitimate, in accordance with yet another embodiment.

FIG. 5 shows a method 500 for conditionally detected malware based on a determination of whether an owner of executable memory associated with a monitored even is legitimate, in accordance with yet another embodiment. As an option, the method 400 may be carried out in the context of the architecture and environment of FIGS. 1-4. Of course, however, the method 400 may be carried out in any desired environment. Again, it should be noted that the aforementioned definitions may apply during the present description.

As shown in operation 502, a trace event is generated and held. The event may include any event associated with (e.g. initiated by) code. Just by way of example, the event may include an invocation of a monitored interface, generation of a monitored IO (e.g. keystroke operation received from a hardware driver), a network transmission (e.g. formed by a user mode application), etc.

In one embodiment, the trace event may be generated artificially (e.g. manually, etc.). For example, the trace event may include an injected process. In another embodiment, the trace event may be generated naturally (e.g. based on operations of an application, when a key is pressed, etc.). To this end, the trace event may be identified in response to generation thereof. Further, the trace event may be held by preventing execution of the event.

Additionally, as shown in operation 504, an element of execution is identified. With respect to the present embodiment, the element of execution of may include any element associated with the event, such as an element utilized for processing the event. For example, the element of execution may include a thread, a process, etc. As an option, the element of execution with the finest granularity that is capable of being determined may be identified (e.g. a process may be identified only if a thread is incapable of being determined, etc.).

Further, as shown in operation 506, interface monitoring is initiated for the element of execution. The interface monitoring may be utilized for identifying interfaces invoked by the element of execution. The interface monitoring may monitor predetermined interfaces. The predetermined interfaces may include interfaces known to be associated with malware (e.g. interfaces known to be utilized by malware for allocating memory, storing data, etc.), interfaces known to be utilized for creating threads, interfaces known to be associated with legitimate processing of the event, interfaces utilized for invoking particular invokees (e.g. drivers, libraries, etc.), etc.

Moreover, handling of the trace event is resumed. Note operation 508. In one embodiment, resuming handling of the trace event may include resuming execution of the trace event. For example, the hold placed on the trace event in operation 502 may be removed.

Still yet, as shown in operation 510, usage of a monitored interface is noted. In the context of the present embodiment, usage of the monitored interface may include any usage of an interface by the element of execution that is monitored via the interface monitoring. Such usage may include invocation of the monitored interface, for example. Thus, it may optionally be determined whether the monitored interface is used by the element of execution, prior to noting such usage. In this way, an execution profile may be assembled for the element of execution by noting the interface usage.

As also shown, executable memory involved with the monitored interface usage is analyzed. Note operation 512. In one embodiment, analyzing the executable memory may include identifying the executable memory. As an option, an address of code using the monitored interface may be determined. For example, the address may be determined by retrieving a call frame return address passed to the monitored interface.

In another embodiment, analyzing the executable memory may include determining a type of the memory pointed to by the address. As an option, the type of the memory may include memory backed by a loaded executable, such as an executable application file or a loadable library. As another option, the type of the memory may include allocated memory not backed by a loaded executable.

As yet another option, the type of the memory may include memory containing interpreted code, such as JAVASCRIPT™. For example, the monitored interface may be invoked by an infrastructure (e.g. operating system, etc.) hosting the interpreted code, rather than the interpreted code itself. It may optionally be determined whether an association exists between the usage of the monitored interface and the interpreted language.

In yet another embodiment, analyzing the executable memory may include determining an owner of the executable memory. The owner of the executable memory may be determined in a manner that is based on the type of the executable memory. For example, if the memory is backed by a loaded executable, the owner may include a file path of the executable memory.

However, if the memory is allocated memory not backed by an executable, the owner may include a process and/or thread that created the executable memory. For example, such process and/or thread may be retrieved by consulting a record of tracked memory regions.

The tracked memory regions may include memory regions within a monitored process that are tracked. It may be determined whether a memory region is allocated memory or memory within another area of interest, such as a data section. Such determination may utilize enumeration and tracking of memory regions of interest including memory dynamically allocated within a process.

At initialization, all dynamically allocated memory within the process being monitored may be enumerated. The enumeration may be performed by checking stack address ranges for each existing thread. In addition, the enumeration may be performed by walking a chain of memory regions allocated from a heap.

Further, the enumeration may include walking the chains of memory regions allocated from kernel mode memory pools, such as kernel mode paged and non-paged memory pools. Walking the chains for kernel mode pool memory and associating already allocated regions with the process being monitored may be limited, depending upon operating system characteristics, such that the pool memory allocated (or associated properties modified after initialization) may be tracked, the pool memory may be tracked globally without association with a particular process, etc. Additional areas of memory to be monitored may also be enumerated during initialization. Such areas may include data sections within a process.

Still yet, an internal data structure may be populated with results of the enumeration, to facilitate tracking of dynamically allocated memory regions and to allow efficient determination if a memory address is included within a dynamically allocated memory region. Also at initialization, monitoring may be enabled for interfaces used to control dynamically allocated memory. In this way, whenever memory is dynamically allocated, resized, deleted, its properties changed, etc., callbacks may be invoked to allow updating of the internal data structure tracking dynamic memory within the process.

In one embodiment, the tracking of dynamically allocated memory may include noting characteristics of the usage of interfaces providing memory allocation, deletion, property modification, etc. For example, such characteristics may indicate a caller of the interface (e.g. was the invocation by an operating system provided function, from within dynamically allocated memory, from within data sections of a process, etc.). As an option, full tracking of pool memory may be available only for regions allocated or whose properties were modified after initialization.

Based on the analysis of the executable memory in operation 512, it is determined whether an owner of the executable memory is legitimate. Note decision 514. Such owner may include an initiator of the monitored interface noted in operation 510. For example, it may be determined if the interface invocation initiator is included within a known legitimate execution profile for the processing of the trace event.

If the initiator is included within the known legitimate execution profile, it may be determined that the owner of the executable memory is legitimate. If, however, it is determined that the initiator is not included within the known legitimate execution profile, it may be determined that the owner of the executable memory is illegitimate.

In one embodiment, the determination may include a comparison of the owner of the executable memory pointed to by a call frame associated with the usage of the monitored interface against a discrete list of legitimate processes and modules predetermined to be associated with the handling of the trace event. In another embodiment, the determination may include tracking a history of the referenced memory regions, such as with behavioral detection.

If it is determined that the owner of the executable memory is legitimate, handling of the event is allowed to continue. Note operation 516. For example, execution of the event may continue. In this way, execution of event identified as legitimate may be allowed to proceed.

If, however, it is determined that the owner of the executable memory is illegitimate, malware is detected, as shown in operation 518. For example, such may indicate malicious activity. As an option, an action may be performed in response to the detection of malware, such as halting the execution of the element of execution, sending an alert to a user or central administrator, etc.

Furthermore, the interface monitoring and/or invocation analysis for the element of execution may be terminated. As an option, the interface monitoring and/or invocation analysis for the element of execution may be terminated in response to detection of the malware and/or in response to completion of handling of the event.

In one exemplary embodiment, a keystroke logger may be detected utilizing an execution profile assembled by tracking interface usage of the keystroke logger. For example, execution of code handling a test keystroke may be monitored for identifying involvement of illegitimate components in such handling. The present example is described herein with respect to detection performed within the WINDOWS® operating system.

Initially, a keystroke event is generated artificially as a trace event and is delivered directly to the bottommost component of the operating system for processing such event. In WINDOWS®, this may be the lowest level kernel mode driver in the keyboard filter driver stack and may correspond to the point where a hardware keyboard event may be sent to the driver stack. The trace event may be delivered via an operating system supplied kernel mode API to invoke the driver stack with a keyboard event, such as with a naturally occurring keystroke event.

An element of execution that may process the trace event is identified. With respect to the present example, the element of execution may include a thread utilized for processing the trace event. As an option, the element of execution may change as the processing progresses. For example, the thread processing the trace event within kernel mode may be different from the thread processing the event within user mode. Further, the thread may change within these modes such as with lower level handling of the trace event being in an arbitrary (non-deterministic) thread and upper processing and delivery to an application being within a specific thread.

The details of the thread processing the trace event at a given point in handling of the trace event may be predetermined based upon specifics of the operating system and legitimate registered software. Interface monitoring is initiated for the element of execution. To this end, usage of monitored interfaces by the element of execution may result in invocation of a registered callback. The callback may determine information about the caller of the interface as described above in operation 512.

As an option, the monitoring may cover both kernel mode and user mode interface usage. Moreover, the handling of the trace event proceeds. For any subsequent interception of the invocation of a monitored interface, it is determined if the interface was invoked by the element of execution being monitored. If so, the address of the code that invoked the interface and the owner of the memory containing that code are determined.

Each of the determined memory region owners is examined. In one embodiment, the discovery of any owner that is not part of a legitimate MICROSOFT® executable image may represent a subversion of keystroke processing by malware. Of course, however, there may also be predetermined legitimate $3^{rd}$-party software that may be involved in processing of the keystroke, such as to support specialized keyboard hardware through the inclusion of a filter driver.

If the interface monitoring is performed for both kernel mode and user mode handling of the keystroke event malware, monitoring the keystroke may be detected at any level, including malware inserted as a kernel mode keyboard filter driver, malware inserted via a kernel mode hook of system service APIs used for keystroke collection, malware inserted via a user mode hook of operating system library APIs used for keystroke collection, malware inserted as a loadable ActiveX® control running within the Internet Explorer web browser, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium comprising instructions stored thereon to cause one or more processors to:
   assemble an execution profile of monitored code by tracking interface usage of the monitored code while the monitored code is executing; and
   determine whether the monitored code is associated with unwanted activity, based on the execution profile, comprising instructions to cause the one or more processors to:
      compare the execution profile to a known legitimate execution profile;
   identify an event associated with the monitored code;
   determine an element of execution associated with the event; and
   determine the execution profile is assembled for the element of execution,
   wherein the execution profile comprises information associated with attributes collected while executing the monitored code.

2. The non-transitory computer readable medium of claim 1, wherein the instructions to cause one or more processors to assemble an execution profile of monitored code comprise instructions to cause one or more processors to assemble an execution profile of monitored code by interface monitoring.

3. The non-transitory computer readable medium of claim 1, wherein tracking interface usage comprises tracking at least one invocation of an interface by the monitored code.

4. The non-transitory computer readable medium of claim 1, wherein the information associated with attributes collected while executing the monitored code comprises information identifying components invoked by the monitored code.

5. The non-transitory computer readable medium of claim 4, wherein the information identifying components comprises information identifying at least one of an interface, a library, and a driver.

6. The non-transitory computer readable medium of claim 1, wherein the instructions to cause one or more processors to assemble an execution profile comprise instructions to cause one or more processors to assemble an execution profile in response to an event associated with the monitored code.

7. The non-transitory computer readable medium of claim 1, wherein the instructions to cause one or more processors to compare the execution profile to a known legitimate execution profile comprise instructions to cause one or more processors to determine that the monitored code is associated with the unwanted activity if the execution profile does not match the known legitimate execution profile.

8. The non-transitory computer readable medium of claim 1, wherein the instructions to cause one or more processors to determine the monitored code is associated with unwanted activity comprise instructions to cause one or more processors to determine that the monitored code is associated with malware activity.

9. The non-transitory computer readable medium of claim 1, wherein the instructions to cause one or more processors to determine the monitored code is associated with unwanted activity comprise instructions to cause one or more processors to determine whether an owner of executable memory associated with the execution profile is legitimate.

10. The non-transitory computer readable medium of claim 9, wherein the instructions to cause one or more processors to determine whether an owner of executable memory associated with the execution profile is legitimate comprise instructions to cause one or more processors to determine the owner of executable memory associated with the execution profile is legitimate if the owner matches a known legitimate process.

11. The non-transitory computer readable medium of claim 9, wherein the instructions to cause one or more processors to determine whether an owner of executable memory associated with the execution profile is legitimate comprise instructions to cause one or more processors to determine the owner of executable memory associated with the execution profile is illegitimate if the owner of the executable memory is illegitimate.

12. The non-transitory computer readable medium of claim 1, further comprising instructions to cause one or more processors to identify an event associated with the monitored code.

13. The non-transitory computer readable medium of claim 12, further comprising instructions to cause one or more processors to determine an element of execution associated with the event.

14. The non-transitory computer readable medium of claim 13, wherein the instructions to cause one or more processors to determine an element of execution is associated with the event comprise instructions to cause one or more processors to determine the execution profile is assembled for the element of execution.

15. The non-transitory computer readable medium of claim 13, wherein the instructions to cause one or more processors to determine the element of execution is associated with the event comprise instructions to cause one or more processors to determine the element of execution includes one of a thread and a process.

16. A method, comprising:
   assembling, with a processor, an execution profile of monitored code by tracking interface usage of the monitored code while the monitored code is executing; and determining whether the monitored code is associated with unwanted activity, based on the execution profile assembled by the processor, comprising:
- comparing the execution profile to a known legitimate execution profile;
- identifying an event associated with the monitored code;
- determining an element of execution associated with the event; and
- determining the execution profile is assembled for the element of execution,
wherein the execution profile comprises information associated with attributes collected while executing the monitored code.

17. The method of claim 16, wherein the information associated with attributes collected while executing the monitored code comprises information identifying components invoked by the monitored code.

18. The method of claim 16, wherein assembling an execution profile comprises assembling an execution profile in response to an event associated with the monitored code.

19. The method of claim 16, wherein comparing the execution profile to a known legitimate execution profile comprises determining that the monitored code is associated with the unwanted activity responsive to the execution profile not matching the known legitimate execution profile.

20. The method of claim 16, wherein determining the monitored code is associated with unwanted activity comprises:
- determining whether an owner of executable memory associated with the execution profile matches a known legitimate process.

21. A system, comprising:
a memory; and
a processor operatively coupled to the memory, the processor adapted to execute program code stored in the memory to:
- assemble an execution profile of monitored code by tracking interface usage of the monitored code while the monitored code is executing, comprising program code to:
  - compare the execution profile to a known legitimate execution profile;
  - identify an event associated with the monitored code;
  - determine an element of execution associated with the event;
  - determine the execution profile is assembled for the element of execution; and
  - determine whether the monitored code is associated with unwanted activity, based on the execution profile,
wherein the execution profile comprises information associated with attributes collected while executing the monitored code.

22. The system of claim 21, wherein the program code to assemble an execution profile of monitored code comprises program code to assemble an execution profile of monitored code by interface monitoring.

23. The system of claim 21, wherein the information associated with attributes collected while executing the monitored code comprises information identifying components invoked by the monitored code.

24. The system of claim 21, wherein the program code to assemble an execution profile comprises program code to assemble an execution profile in response to an event associated with the monitored code.

25. The system of claim 21, wherein the program code to compare the execution profile to a known legitimate execution profile comprises program code to determine that the monitored code is associated with the unwanted activity responsive to the execution profile not matching the known legitimate execution profile.

26. The system of claim 21, wherein the program code to determine the monitored code is associated with unwanted activity comprises program code to:
- determine whether an owner of executable memory associated with the execution profile matches a known legitimate process.

* * * * *